United States Patent [19]

Pruett et al.

[11] 4,443,413
[45] Apr. 17, 1984

[54] SEPARATION OF URANIUM FROM TECHNETIUM IN RECOVERY OF SPENT NUCLEAR FUEL

[75] Inventors: David J. Pruett; Donald R. McTaggart, both of Knoxville, Tenn.

[73] Assignee: The United States of America as represented by the United States Department of Energy, Washington, D.C.

[21] Appl. No.: 528,279

[22] Filed: Aug. 31, 1983

[51] Int. Cl.³ .................. C01G 43/00; C01G 57/00
[52] U.S. Cl. ........................................ 423/10; 423/2
[58] Field of Search ............................. 423/2, 10

[56] References Cited

U.S. PATENT DOCUMENTS

| | | | |
|---|---|---|---|
| 2,982,601 | 5/1961 | Wilson | 423/10 |
| 3,374,068 | 3/1968 | Erlandson et al. | 423/2 |
| 3,808,320 | 4/1974 | Kaiser et al. | 423/10 |
| 3,827,986 | 8/1974 | Charlton et al. | 423/2 |
| 4,092,265 | 5/1978 | Longo et al. | 423/2 |
| 4,116,863 | 9/1978 | Berton et al. | 423/2 |
| 4,162,231 | 7/1979 | Horwitz et al. | 423/2 |

OTHER PUBLICATIONS

Campbell "Extraction of Pertechnetate in a Purex Process", HW-69712, Hanford Atomic Prod. Op. (May 24, 1981) Richland, Wa.

Saracceno, "The Control of Technetium at the Portsmouth Gaseous Diffusion Plant", GAT-2010, Goodyear Atomic Corp. (Nov. 1981) Piketon, Ohio.

Siddall, "Behavior of Technetium in the Purex Process", M-3679, 22nd Ed., Rev. 1, E. I. Du Pont de Nemours & Co., At. En. Div. Techn. Div. (Apr. 1959) Savannah R.V. Lab.

*Primary Examiner*—Edward A. Miller
*Attorney, Agent, or Firm*—Edwin D. Grant; Stephen D. Hamel; Michael F. Esposito

[57] ABSTRACT

Uranium and technetium in the product stream of the Purex process for recovery of uranium in spent nuclear fuel are separated by (1) contacting the aqueous Purex product stream with hydrazine to reduce $Tc^{+7}$ therein to a reduced species, and (2) contacting said aqueous stream with an organic phase containing tributyl phosphate and an organic diluent to extract uranium from said aqueous stream into said organic phase.

1 Claim, 1 Drawing Figure

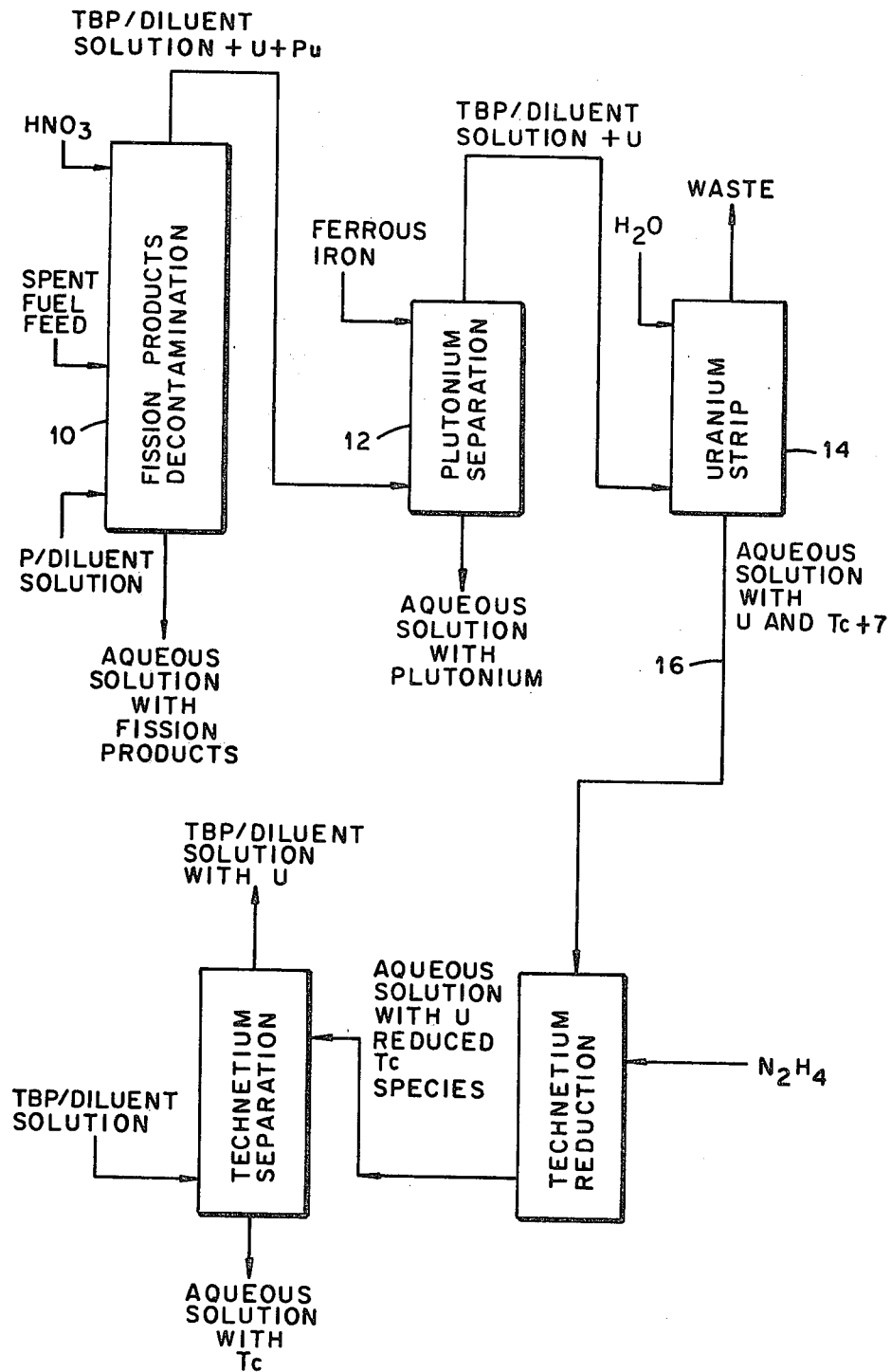

SEPARATION OF URANIUM FROM TECHNETIUM IN RECOVERY OF SPENT NUCLEAR FUEL

This invention, which resulted from a contract with the United States Department of Energy, relates to an improved process for the recovery of uranium in spent nuclear fuel.

BACKGROUND OF THE INVENTION

Spent nuclear fuel elements are processed to separate uranium, plutonium and fission products therein by a continuous, countercurrent solvent extraction operation commonly known as the Purex process. This process comprises the basic steps of (1) separation of fission products from U and Pu, (2) separation of U from Pu, and (3) further decontamination and concentration of U and Pu product streams. More specifically, U and Pu are extracted from a nitric acid solution (used to dissolve the spent fuel elements) into an organic phase containing tributyl phosphate (TBP) and an organic diluent such as dodecane, leaving most fission products in the aqueous phase. However, technetium is produced in large quantities in nuclear reactors, and whenever both $UO_2{}^{2+}$ and the pertechnetate ion ($TcO_4{}^-$) are in the same solution, a complex containing both $UO_2{}^{2+}$ and $TcO_4{}^-$ is formed which prevents separation of uranium from the technetium by the conventional steps of the Purex process.

When reprocessed U containing Tc is recycled to gaseous diffusion plants for enrichment, accumulation of Tc in process equipment causes various operational problems. Current methods for removing Tc from reprocessed U are employed only on the feed to gaseous diffusion plants and involve the sorption of gaseous technetium fluorides on solid traps. It would be more convenient to separate U and Tc in association with the chemical steps of the Purex process.

SUMMARY OF THE INVENTION

It is therefore an object of this invention to provide a chemical process for separating U and Tc which are contained in the product uranyl nitrate stream of the Purex process.

This object is achieved in accordance with the invention by contacting the product stream of the Purex process with hydrazine to thereby convert $Tc^{+7}$ therein to a reduced Tc species and then contacting the aqueous solution containing U and the reduced Tc species with an organic phase containing tributyl phosphate and an organic diluent to extract U from this aqueous solution into the organic phase while leaving substantailly all of the reduced Tc species in the aqueous solution.

DESCRIPTION OF THE DRAWING

The single drawing is a schematic representation of the Purex process and the associated method of separating U and Tc in the product stream thereof in accordance with the invention.

DETAILED DESCRIPTION OF THE INVENTION

In the accompanying drawing, the conventional steps of the Purex process are illustrated by flow streams associated with the columns designated by reference numbers 10, 12, 14. The product stream from the Purex process is designated by reference number 16 in the flow diagram and typically comprises 0.01–0.10 M nitric acid, 1.0 M $UO_2(NO_3)_2$, and as much as 0.004 M $TcO_4$.

In accordance with the invention, $N_2H_4$ is added to the aqueous $UO_2(NO_3)_2$ stream 16 in a concentration of 0.01 to 0.10 M at a temperature of 22° C. $TcO_4{}^-$ in stream 16 is thereby reduced, and the reduced Tc species (probably Tc(IV) and/or Tc(V) species) is separated from the $UO_2{}^+$ by solvent extraction with an equal volume of 30 volume percent TBP in n-dodecane. The Tc is removed in the aqueous phase for recovery or disposal as waste. The purified U product is water stripped from the organic phase.

A series of experimental tests were performed in which the initial aqueous phase simulated the aqueous $UO_2(NO_3)_2$ product stream from the Purex process. Details and results of these tests are given in the following examples.

EXAMPLE I

A series of aqueous phases were prepared with each containing uranium [1.0 M $UO_2(NO_3)_2$], technetium (0.004 M $KTcO_4$) and concentrations of $HNO_3$ ranging from 0 to 0.10 M. An organic phase consisting of 30 volume percent TBP in n-dodecane was added to each aqueous phase in a 1:1 ratio. Each solution was equilibrated at 22° C. for 15 minutes and the distribution coefficients for Tc and U (D=organic phase conc./aqueous phase conc.), and the decontamination factors (DF=$D_U/D_{Tc}$) were determined. Results are shown in Table I.

TABLE I

| Initial [$HNO_3$]$_{aq}$(M) | $D_{Tc}$ | $D^*_U$ | DF ($D_U/D_{Tc}$) |
| --- | --- | --- | --- |
| 0.01 | 0.806 | 0.684 | 0.849 |
| 0.05 | 0.895 | 0.688 | 0.768 |
| 0.10 | 0.856 | 0.738 | 0.862 |
| 0.00 | 0.859 | 0.685 | 0.797 |
| 0.00 | 0.869 | 0.688 | 0.791 |
| 0.00 | 0.868 | 0.693 | 0.798 |
| 0.00 | 0.863 | 0.690 | 0.800 |
| 0.00 | 0.875 | 0.680 | 0.777 |
| 0.00 | 0.841 | 0.687 | 0.817 |

*Estimated from UV-visible spectrum.

EXAMPLE II

A series of aqueous phases were prepared as in Example I. Hydrazine was added to each in concentrations ranging from 0.01 to 0.10 M. The aqueous phases were then equilibrated with the organic phase under the same conditions as in Example I. The distribution coefficients for Tc and U and decontamination factors (DF=$D_U/D_{Tc}$) were determined. The results are shown in Table II.

TABLE II

| [$N_2H_4$]$_{added}$ (M) | $D_{Tc}$ | $D^*_U$ | DF |
| --- | --- | --- | --- |
| 0.10 | 0.00651 | 0.684 | 105 |
| 0.10 | 0.00634 | 0.688 | 109 |
| 0.10 | 0.00661 | 0.738 | 111 |
| 0.01 | 0.00826 | 0.685 | 82.3 |
| 0.02 | 0.00685 | 0.688 | 100 |
| 0.04 | 0.00725 | 0 693 | 95.6 |
| 0.06 | 0.00664 | 0.690 | 104 |
| 0.08 | 0.00707 | 0.680 | 96.2 |
| 0.10 | 0.00621 | 0.687 | 111 |

What is claimed is:

1. In a spent nuclear fuel recovery process wherein a stream containing U and $Tc^{+7}$ is contacted with an organic phase containing tributyl phosphate and an organic diluent to extract U and and $Tc^{+7}$ from said stream into said organic phase and subsequently U and $Tc^{+7}$ are stripped from said organic phase into an aqueous solution, the improvement comprising:

(1) contacting said aqueous solution with hydrazine to thereby convert the $Tc^{+7}$ therein to a reduced Tc species; and
(2) contacting said aqueous solution containing U and the reduced Tc species with an organic phase containing tributyl phosphate and an organic diluent to extract U from said aqueous solution into said organic phase while leaving substantially all of the reduced Tc species in the aqueous solution.

* * * * *